US009977681B2

(12) United States Patent
Patel et al.

(10) Patent No.: US 9,977,681 B2
(45) Date of Patent: May 22, 2018

(54) SYSTEM AND METHOD FOR PARTITION STARTUP/SHUTDOWN IN A MULTITENANT APPLICATION SERVER ENVIRONMENT

(71) Applicant: Oracle International Corporation, Redwood Shores, CA (US)

(72) Inventors: Chanda Rani Patel, Milpitas, CA (US); Timothy Quinn, Lake Forest, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 58 days.

(21) Appl. No.: 15/064,754

(22) Filed: Mar. 9, 2016

(65) Prior Publication Data

US 2017/0017494 A1  Jan. 19, 2017

Related U.S. Application Data

(60) Provisional application No. 62/191,794, filed on Jul. 13, 2015.

(51) Int. Cl.
*G06F 9/44* (2018.01)
*G06F 9/45* (2006.01)
(Continued)

(52) U.S. Cl.
CPC ............ *G06F 9/4401* (2013.01); *G06F 9/442* (2013.01); *G06F 9/45533* (2013.01); *G06F 9/5077* (2013.01); *G06F 2009/45575* (2013.01)

(58) Field of Classification Search
CPC .... G06F 9/4401; G06F 9/442; G06F 9/45533; G06F 9/5077
See application file for complete search history.

(56) References Cited

U.S. PATENT DOCUMENTS 6,725,317 B1 * 4/2004 Bouchier .............. G06F 15/177
709/220
2009/0276771 A1  11/2009 Nickolov
(Continued)

OTHER PUBLICATIONS

United States Patent and Trademark Office, Office Action dated Apr. 27, 2017 for U.S. Appl. No. 14/748,094, 12 Pages.
(Continued)

*Primary Examiner* — Stefan Stoynov
(74) *Attorney, Agent, or Firm* — Tucker Ellis LLP

(57) ABSTRACT

In accordance with an embodiment, described herein is a system and method for supporting partition and resource group shutdown and startup in an application server environment. A method can provide one or more partitions, wherein each partition provides an administrative and runtime subdivision of a domain, and one or more resource groups, wherein each of the one or more resource groups is associated with one of the one or more partition. The method receive, from an administrator, a request to perform a startup or shutdown, the startup or shutdown action being targeted to one of the one or more partition. The method can provide a lifecycle object, at an administration server, the lifecycle object associated with the one of the one or more partitions. The method can provide a monitoring object where the monitoring object can allow the administrator to monitor a status of the startup or shutdown action.

20 Claims, 12 Drawing Sheets

(51) Int. Cl.
G06F 9/50 (2006.01)
G06F 9/455 (2018.01)

(56) References Cited

U.S. PATENT DOCUMENTS

2013/0204917 A1* 8/2013 Wang .................... G06F 9/52
                                                    709/201
2013/0332577 A1   12/2013 Nakil
2013/0339470 A1   12/2013 Jeswani et al.

OTHER PUBLICATIONS

United States Patent and Trademark Office, Office Action dated Nov. 29, 2017 for U.S. Appl. No. 14/748,094, 15 Pages.

* cited by examiner

SYSTEM AND METHOD FOR PARTITION STARTUP/SHUTDOWN IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR PARTITION STARTUP/STOP IN A MULTITENANT APPLICATION SERVER ENVIRONMENT", Application No. 62/191,794, filed Jul. 13, 2015; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; and U.S. Patent Application titled "SYSTEM AND METHOD FOR SUPPORTING PARTITIONS IN A MULTITENANT APPLICATION SERVER ENVIRONMENT", application Ser. No. 14/748,094, filed Jun. 23, 2015, which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for partition start/stop in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant. These are some examples of the type of environments in which embodiments of the present invention can be used.

SUMMARY

In accordance with an embodiment, described herein is a system and method for supporting partition and resource group shutdown and startup in an application server environment. A method can provide, at one or more computers, including an application server environment executing thereon, one or more partitions, wherein each partition provides an administrative and runtime subdivision of a domain, and one or more resource groups, wherein each of the one or more resource groups is associated with one of the one or more partition. The method can then receive, from an administrator, a request to perform a startup or shutdown, the startup or shutdown action being targeted to one of the one or more partition. The method can provide a lifecycle object, at an administration server, the lifecycle object associated with the one of the one or more partitions. Finally, the method can provide a monitoring object in association with the startup or shutdown request, the monitoring object allowing the administrator to monitor a status of the startup or shutdown action.

In accordance with an embodiment, the system and method for supporting partition and resource group shutdown and startup in an application server environment can allow for more efficient use of resources.

In accordance with an embodiment, the lifecycle object can alternatively be provided primarily as data, being accessible from more than one server.

DETAILED DESCRIPTION

In accordance with an embodiment, described herein is a system and method for supporting partition and resource group shutdown and startup in an application server environment.

Application Server (e.g., Multi-Tenant, MT) Environment

Figure 1:
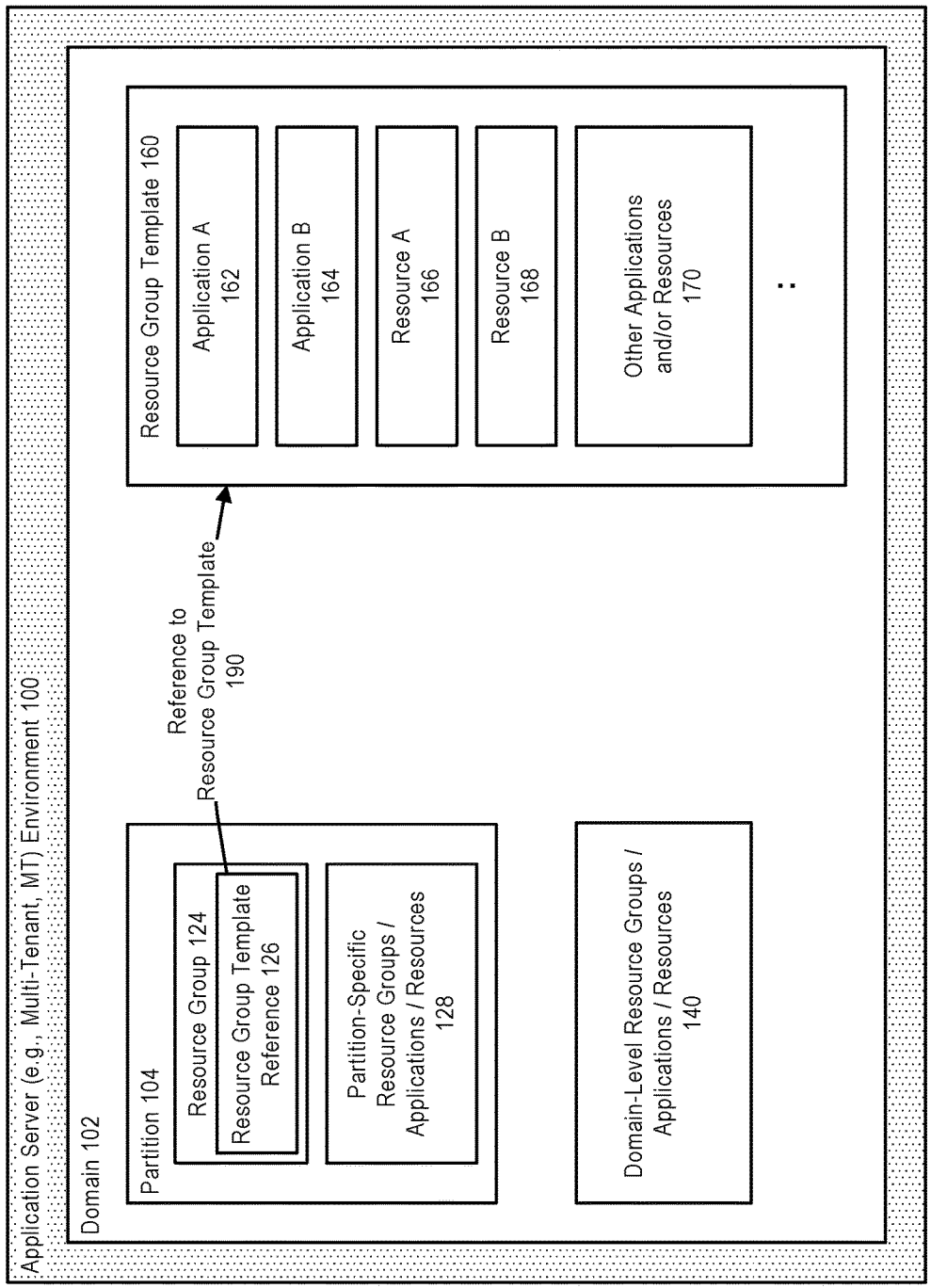
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
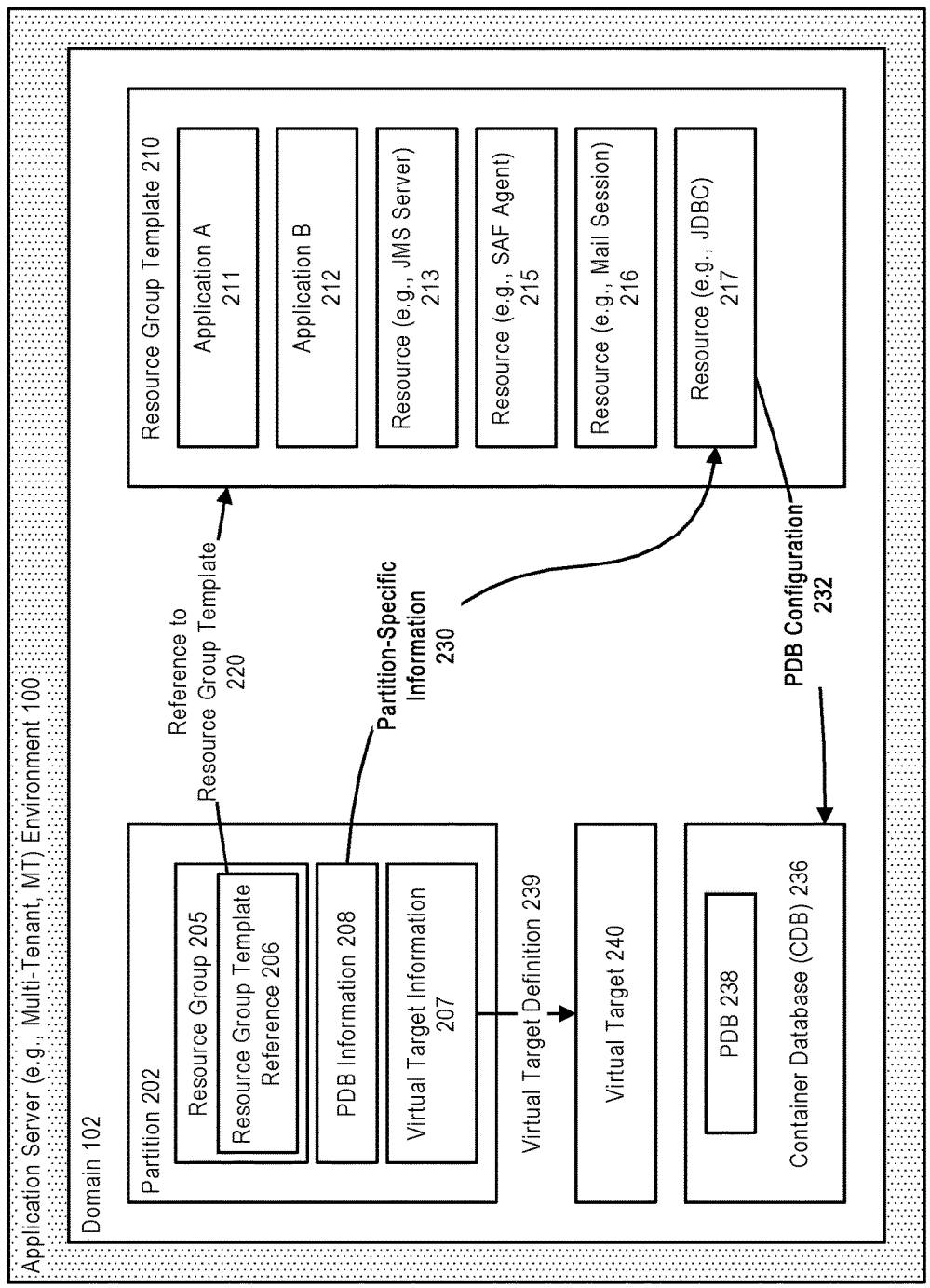
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with an embodiment, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
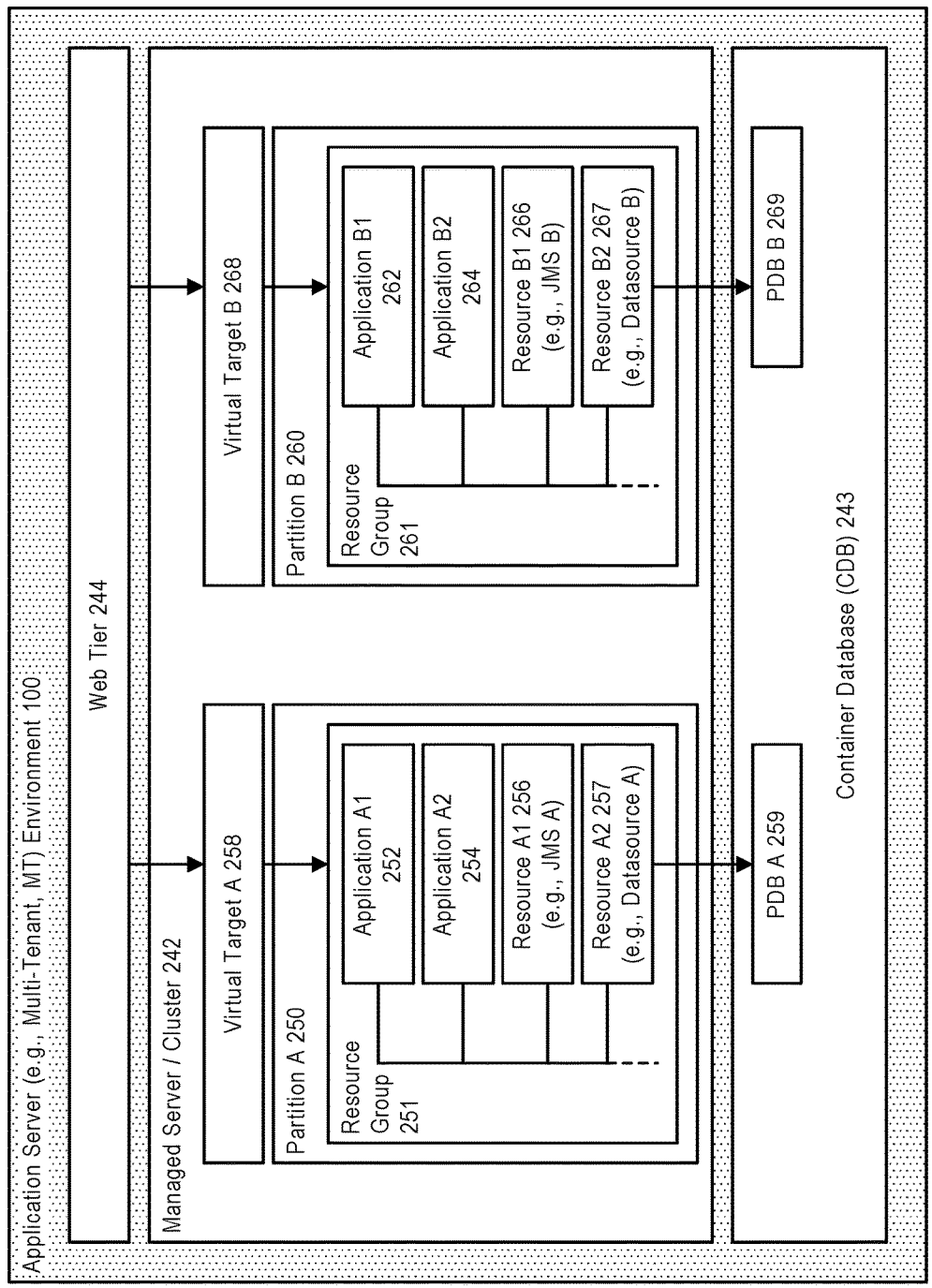
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with an embodiment, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level-partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
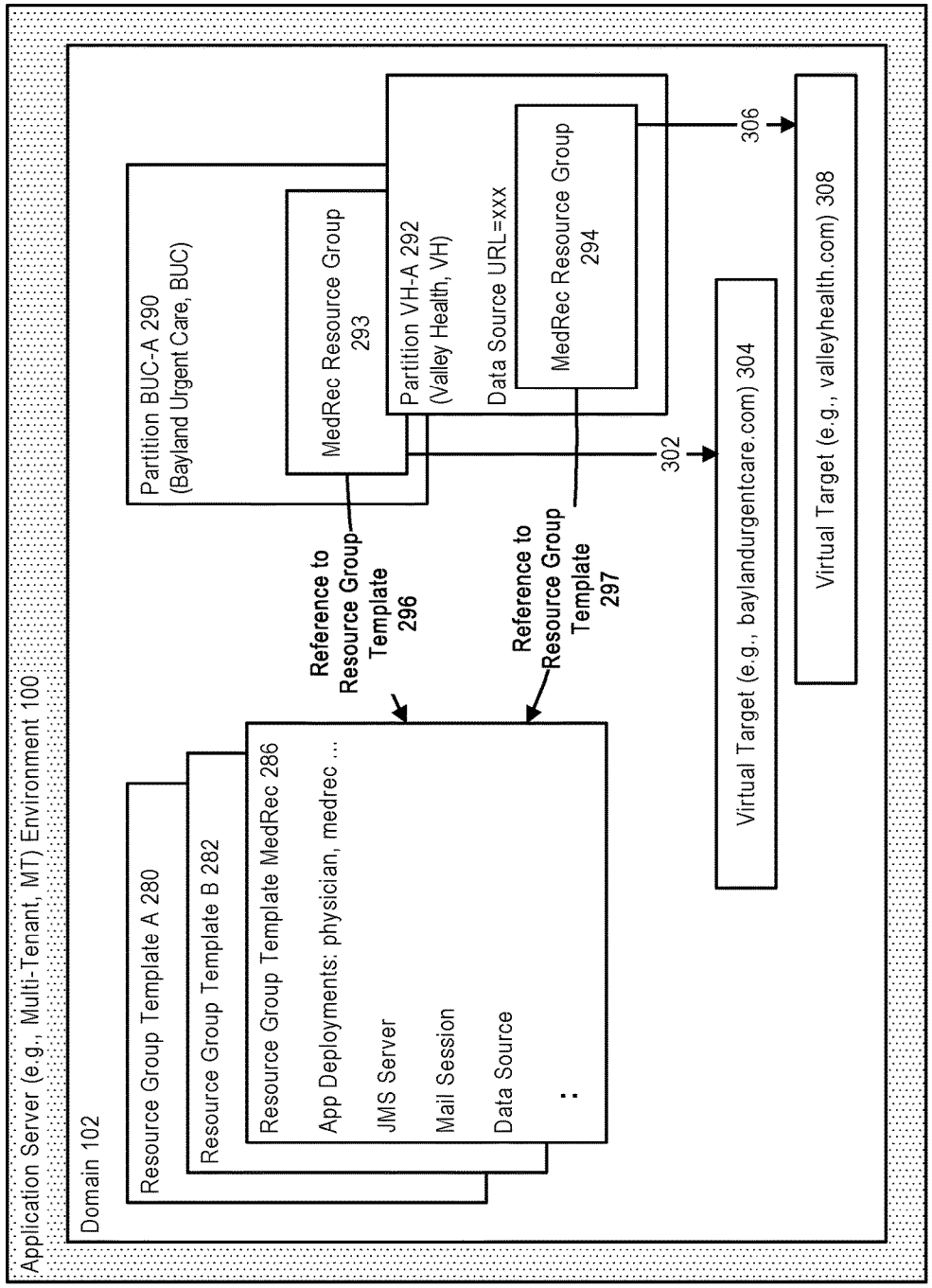
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
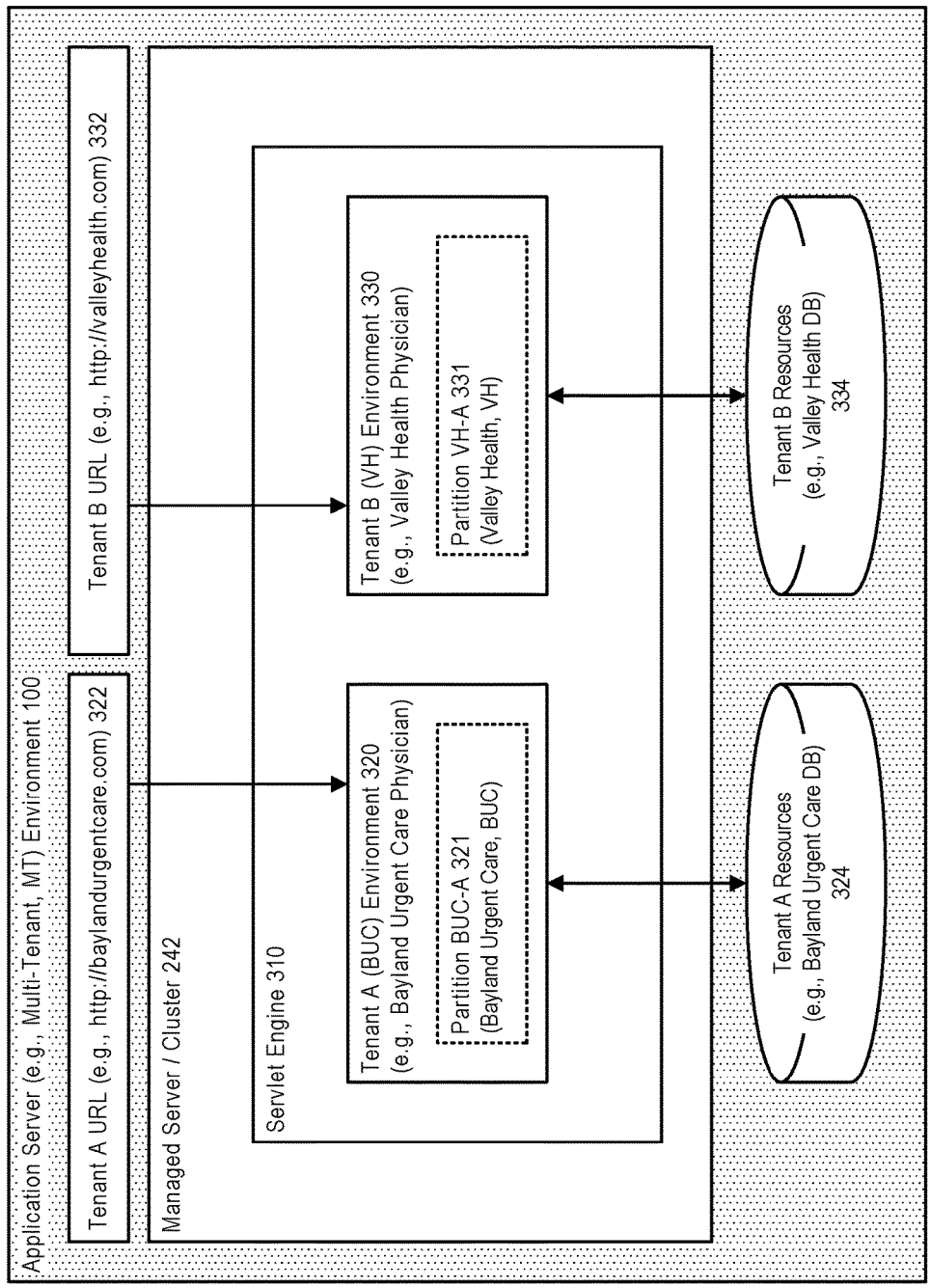
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Partition Startup/Shutdown

In accordance with an embodiment, it is desirable to provide administrators, such as system and partition administrators, with the ability to shut down and/or start up a partition or a resource group. In certain situations, this means shutting down and starting up the applications and deployable resources within a partition or resource group. Systems and methods can support the types of states, operations, and behavior which managed servers expose.

In accordance with an embodiment, administrators can manage and monitor life cycles of partitions and resource groups. This can involve managing and monitoring the life cycles of applications and resources deployed to partitions and resource groups. Once an administrator changes the state of a partition or resource group, that runtime state can be persisted. A partition or resource group can resume the same state upon server restart. The persisted runtime state, as well as the existing application runtime state, can be stored in a persistent store.

In accordance with an embodiment, the term shutdown (or "shut down") can mean an operation on a partition or resource group that causes application deployments and resources running in the partition or resource group to cease operating and be removed from a virtual machine's (e.g., Java Virtual Machine's) memory. Shutdown can also affect other subsystems that are not directly related to deployable entities using interceptors and event listeners.

In accordance with an embodiment, the term start (or startup) can mean an operation on a partition or resource group that causes application deployments and/or resources not currently running to become active and responsive to end users and other components. Startup can also impact other subsystems in ways that are not directly related to deployable entities.

A startup operation can, in accordance with an embodiment, either startup a partition in an admin mode or startup the partition in normal operations mode. If a partition is started in admin mode, the partition, once started, can go into admin mode. If a partition is started regularly, the partition can start normally, allowing access to applications and resources within the partition. If a running partition is suspended, the partition can go from the running, normal state to admin mode.

In accordance with an embodiment, within an administration server (referred to herein variously as "admin server"), lifecycle runtime MBeans can represent all partitions and resources, whether running or not. An admin client can invoke operations on these lifecycle runtime MBeans, specifying an optional list of targets.

In accordance with an embodiment, a lifecycle runtime MBean can use existing admin server-to-managed server RemoteLifeCycleOperations mechanism to communicate a requested operation to one or more targeted managed servers where the partition or resource group resides, filtered by the optional target list. In each managed server, code receiving an incoming RMI (Java™ Remote Method Invocation) call can invoke a corresponding method to operate on a specified partition or resource group. In the case of partitions, any interceptors can be invoked around the operation.

In accordance with an embodiment, a partition or resource group operation itself can delegate to a deployment subsystem. The deployment subsystem can respond to the state change in the same way it would for the similar server state change, except it works only with the applications and resources in the partition or resource group of interest. When starting a partition, a managed server on which the partition is running can create the partition's PartitionRuntimeMBean. When a partition is shut down, the managed server can remove the PartitionRuntimeMBean.

The systems and methods described herein can be used, for example, in a situation where a resource consumption manager (RCM) signals that a partition should be shut down. For example, a RCM in a managed server can request a forced partition shutdown in a targeted managed server when, for example, the partition is running away with memory and starving other partitions on the same managed server of resources. Or, for example, an admin client can connect directly to a managed server to start a partition there. This can be a fix, or an "antidote," to the RCM recourse, or a partition might have been previously shut down via the admin server but, for a reason, the admin server cannot be used to restart the partition.

In accordance with an embodiment, a running partition can be running on/targeted to at least one managed server, if not more. There are, in general, two options administrators can use in starting and/or shutting down a partition running/targeted to on one or more managed servers.

First, in accordance with an embodiment, an administrator can, from an admin server, utilize partition lifecycle runtime MBeans to shut down partitions running on one or more managed servers. The partition lifecycle runtime MBeans can reside in a domain runtime tree. By using the life cycle MBeans, and administrator can find the partition runtime MBeans, and administrator can lookup which partitions are running on which managed servers (e.g., targets). After performing a lookup, the administrator can perform either a startup or shutdown on the partitions. For example, a partition in an application server environment can be running on 5 managed servers. After looking up the partition's life cycle MBean, a system administrator can shut down the partition running on the 5 managed servers. This can be performed, for example, when a partition is running away with memory and starving other partitions running on the same managed servers.

Second, in accordance with an embodiment, an administrator can also directly access a managed server that a partition is running on. From there, the server-specific partition runtime MBean can be found and started/shutdown from there. Partition runtime MBeans can be targeted to servers. For example, if there a partition is targeted to 5 managed servers, then each server can have its own partition runtime MBean.

In accordance with an embodiment, the present disclosure can also allow for monitoring by an administrator to ensure completion of a task. When, for example, an administrator performs either a startup or a shutdown on a partition, a task object can be supplied to the administrator. The task object can be a task MBean. Through the task object, the administrator can monitor the status of action performed. For example, after an administrator performs a shut down on a partition, the administrator can be supplied with a task object that can allow the administrator to monitor the shut down process until it is completed.

Figure 6:
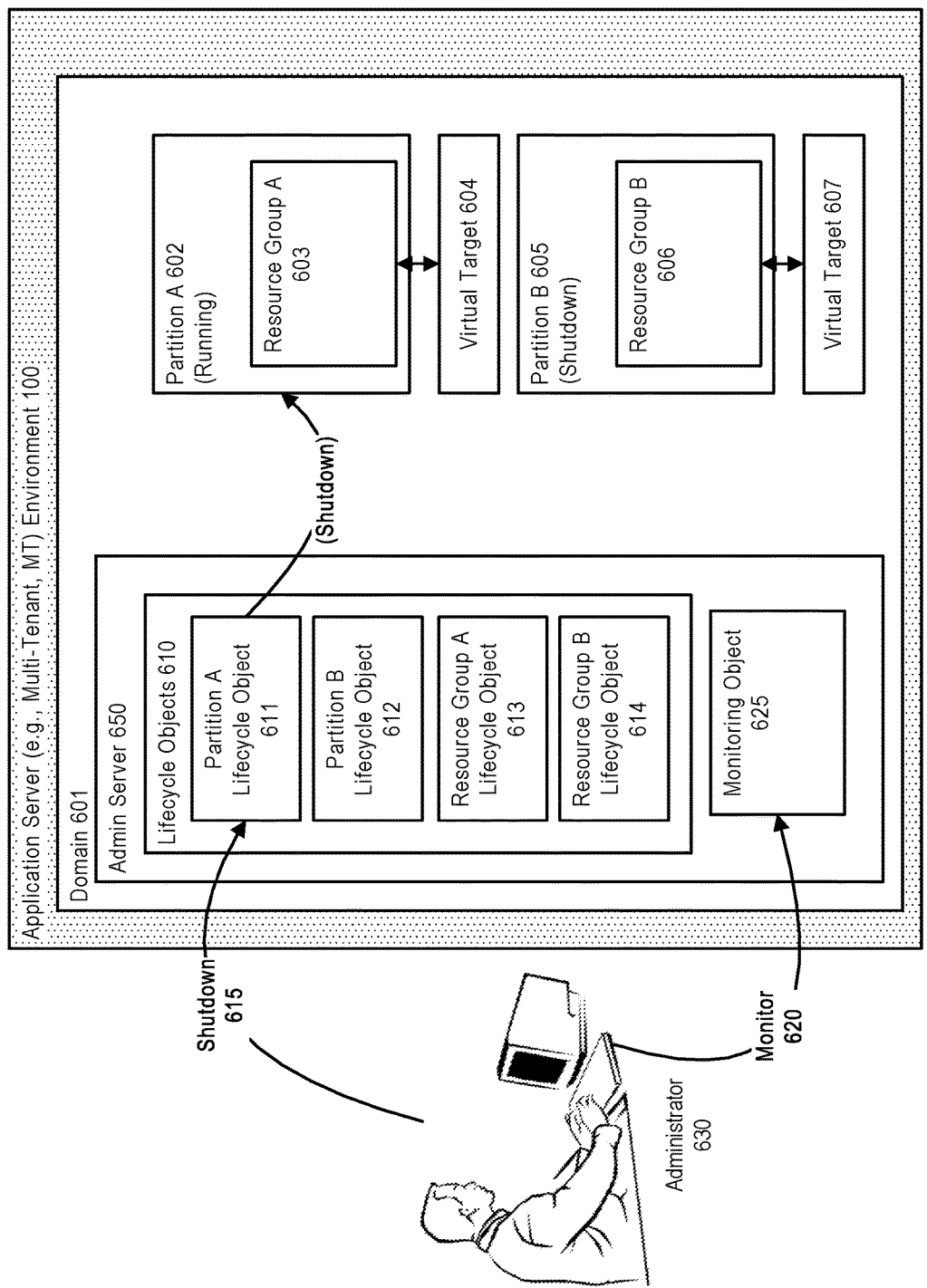
FIG. 6 illustrates supporting partition and resource group shutdown and startup within an application server environment, in accordance with an embodiment.

FIG. 6 illustrates supporting partition and resource group shutdown and startup in an application server environment, in accordance with an embodiment. As shown in FIG. 6, an application server environment 100 can include a domain 601, which can host partition A 602 and partition B 605. Partitions A and B 602 and 605, can include resource groups, such as resource group A 603 and resource group B 608, respectively, which can be associated with virtual targets 604 and 607, respectively.

In accordance with an embodiment, the domain 601 within the application server environment 100 can additionally host an admin server 650, which can in turn include a number of lifecycle objects 610, such as partition A lifecycle object 611, partition B lifecycle object 612, resource group A lifecycle object 613, and resource group B lifecycle object 614. The admin server 650 can additionally include a monitoring object 625. In accordance with an embodiment, the various objects, such as the partition lifecycle objects, resource group lifecycle objects, and monitoring objects, can be various MBeans, such as lifecycle lifecycleruntimeMbeans. For example, partition A lifecycle object 611 can be PartitionALifecycleRuntimeMBean, partition B lifecycle object 612 can be PartitionBLifecycleRuntimeMBmean, resource group A lifecycle object can be ResourceGroupALifecycleRuntimeMBean, and resource group B lifecycle object can be ResourceGroupBLifecycleRuntimeMBean.

In accordance with an embodiment where at least one of the partitions are currently running, an administrator 630 can perform a shutdown 615 action in association with one or more of the running partitions. For example, as shown in FIG. 6, partition A 602 is currently running. Upon the commencement of the shutdown 615 action performed on the partition A lifecycle object 611, the monitoring object 625 can be provided that allows for the administrator to monitor 620 the status of the execution of the shutdown action on partition A 602.

Figure 7:
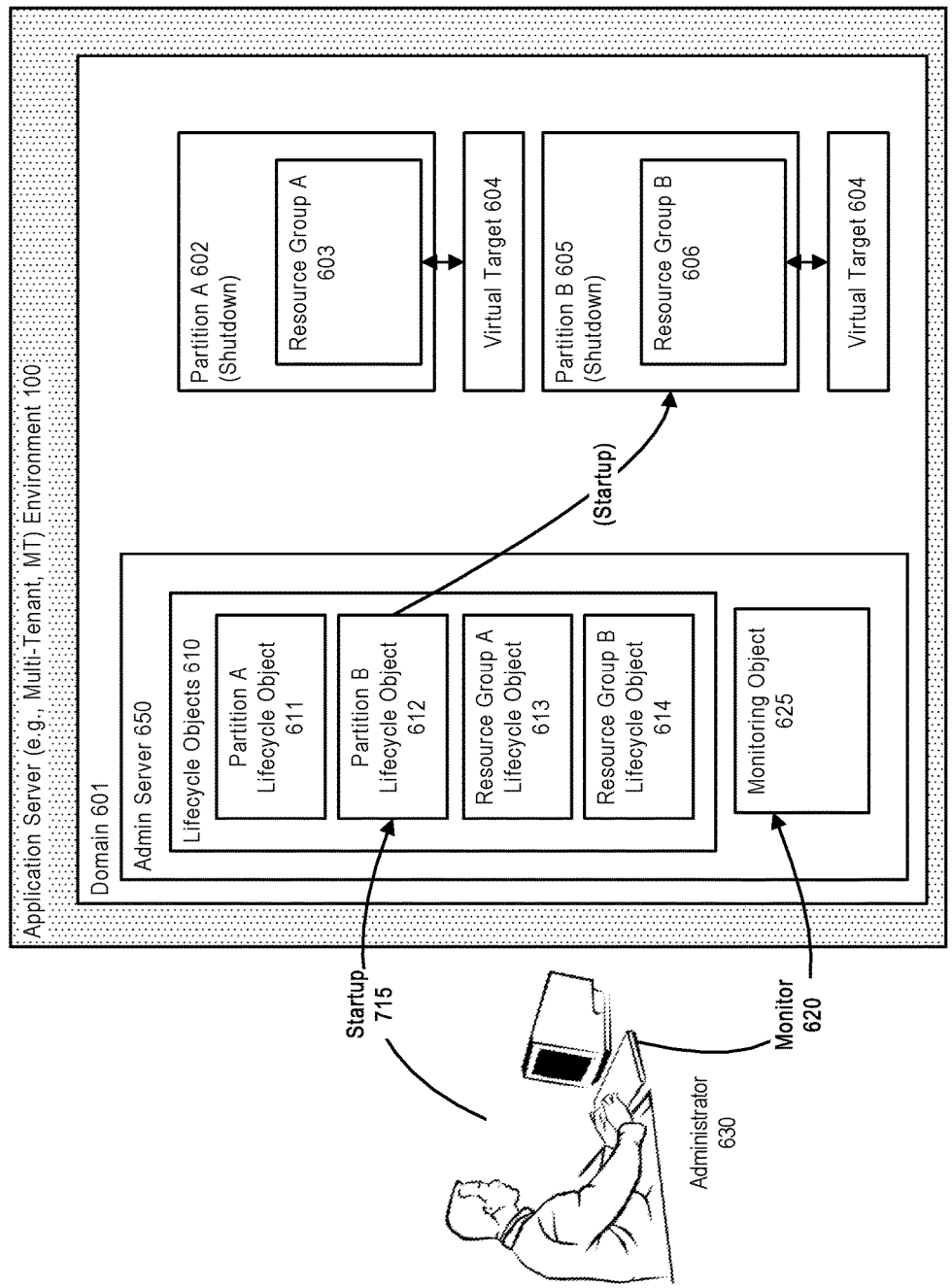
FIG. 7 illustrates supporting partition and resource group shutdown and startup within an application server environment, in accordance with an embodiment.

FIG. 7 illustrates supporting partition and resource group shutdown and startup in an application server environment, in accordance with an embodiment. As shown in FIG. 7, an application server environment 100 can include a domain 601, which can host partition A 602 and partition B 605. Partitions A and B 602 and 605, can include resource groups, such as resource group A 603 and resource group B 608, respectively, which can be associated with virtual targets 604 and 607, respectively.

In accordance with an embodiment, the domain 601 within the application server environment 100 can additionally host an admin server 650, which can in turn include a number of lifecycle objects 610, such as partition A lifecycle object 611, partition B lifecycle object 612, resource group A lifecycle object 613, and resource group B lifecycle object 614. The admin server 650 can additionally include a monitoring object 625. In accordance with an embodiment, the various objects, such as the partition lifecycle objects, resource group lifecycle objects, and monitoring objects, can be various MBeans, such as lifecycleruntimeMbeans. For example, partition A lifecycle object 611 can be PartitionALifecycleRuntimeMBean, partition B lifecycle object 612 can be PartitionBLifecycleRuntimeMBmean, resource group A lifecycle object can be ResourceGroupALifecycleRuntimeMBean, and resource group B lifecycle object can be ResourceGroupBLifecycleRuntimeMBean.

In accordance with an embodiment where at least one of the partitions is currently not running (e.g., shutdown), an administrator 630 can perform a startup 715 action in association with one or more of the shutdown partitions. For example, as shown in FIG. 7, partition B 605 is currently shutdown. Upon the commencement of the startup 715 action performed on the partition B lifecycle object 612, the monitoring object 625 can be provided that allows for the administrator to monitor 620 the status of the execution of the startup action on partition B 605.

Figure 8:
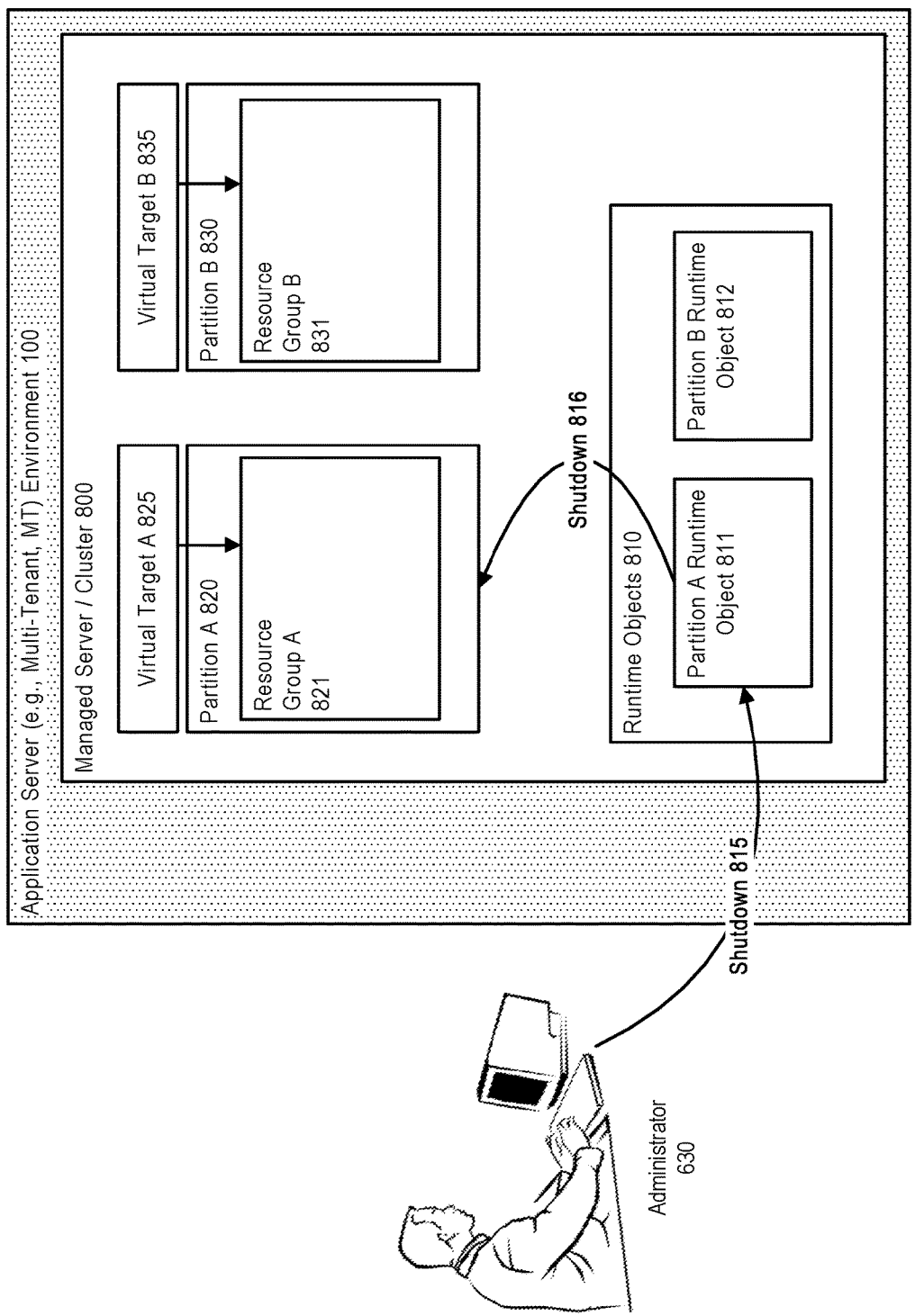
FIG. 8 illustrates supporting partition and resource group shutdown and startup within an application server environment, in accordance with an embodiment.

FIG. 8 illustrates supporting partition and resource group shutdown and startup in an application server environment, in accordance with an embodiment. As shown in FIG. 8, an application server environment 100 can include a managed server (or managed server cluster) 800, which can host partition A 820 and partition B 830. Partitions A and B 820 and 830, can include resource groups, such as resource group A 821 and resource group B 831, respectively, which can be associated with virtual targets 825 and 835, respectively.

In accordance with an embodiment, the managed server 800 can include a number of runtime objects 810, such as partition A runtime object 811, partition B runtime object 812. In accordance with an embodiment, the various objects, such as the partition runtime objects, can be various runtime MBeans, such as runtimeMbeans. For example, partition A runtime object 811 can be PartitionARuntimeMBean, and partition B runtime object 812 can be PartitionBRuntimeMBean.

In accordance with an embodiment where at least one of the partitions is currently running on the managed server 800, an administrator 630 can connect directly to the managed server 800 and perform a shutdown action 815 on the runtime object of the targeted, running partition. For example, administrator 630 can connect directly to the managed server 800 and perform a shutdown action 815 on partition A runtime object 811, which can then shutdown 816 partition A 820.

Figure 9:
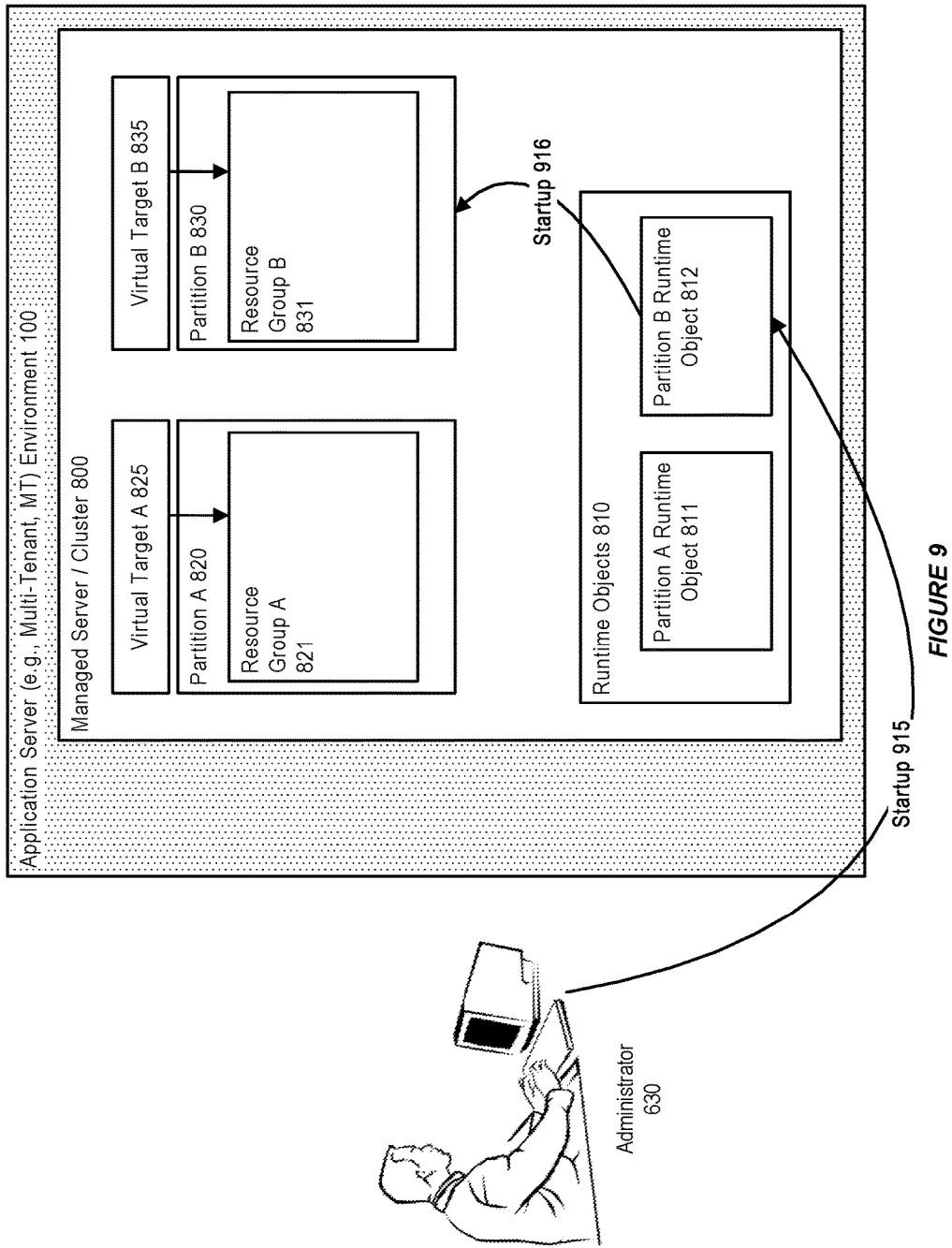
FIG. 9 illustrates supporting partition and resource group shutdown and startup within an application server environment, in accordance with an embodiment.

FIG. 9 illustrates supporting partition and resource group shutdown and startup in an application server environment, in accordance with an embodiment. As shown in FIG. 9, an application server environment 100 can include a managed server (or managed server cluster) 800, which can host partition A 820 and partition B 830. Partitions A and B 820 and 830, can include resource groups, such as resource group A 821 and resource group B 831, respectively, which can be associated with virtual targets 825 and 835, respectively.

In accordance with an embodiment, the managed server 800 can include a number of runtime objects 810, such as partition A runtime object 811, partition B runtime object 812. In accordance with an embodiment, the various objects, such as the partition runtime objects, can be various runtime MBeans, such as runtimeMbeans. For example, partition A runtime object 811 can be PartitionARuntimeMBean, and partition B runtime object 812 can be PartitionBRuntimeMBmean.

In accordance with an embodiment where at least one of the partitions is currently not running on the managed server 800, an administrator 630 can connect directly to the managed server 800 and perform a startup action 915 on the runtime object of the targeted, shutdown partition. For example, administrator 630 can connect directly to the managed server 800 and perform a startup action 915 on partition B runtime object 812, which can then startup 916 partition B 830.

In accordance with an embodiment, the admin server can contain life cycle runtime MBeans, each of which can represents a runtime component that can run somewhere in the domain. Admin clients can operate on life cycle runtime MBeans to control the corresponding runtime components and monitor the states of the same runtime components. For example, a life cycle runtime MBean for a runnable entity can exists in the admin server, even if that entity is not currently running anywhere. Because of this, a startup operation can be exposed at the life cycle runtime Mbean.

In contrast, in accordance with an embodiment, the admin server's domain runtime tree and the managed servers' runtime trees contain runtime MBeans which represent objects or components that are currently running. If the entity is shut down (through un-deployment or un-targeting, for example) the resource ceases to operate and the corresponding runtime MBean vanishes. For example, a partition running in a managed server can cause a runtime MBean to be created in the managed server's runtime tree. If the partition is un-targeted from the partition, or shut down, the partition's runtime MBean in the managed server's runtime tree can cease.

In accordance with an embodiment, partitions and resource groups can follow a same life cycle model. PartitionLifeCycleRuntimeMBeans and ResourceGroupLifeCycleRuntimeMBeans can exist in the admin server for each partition and resource group, regardless of state. Admin clients can operate on the life cycle runtime beans to change the state of the corresponding partition or resource group and to find out the respective states.

In accordance with an embodiment, in managed servers, the PartitionRuntimeMBean can exist when the partition is targeted to that managed server and has not been shut down there. This runtime MBean can have private CRUD-related methods for the runtime MBeans for resources and apps within the partition. The runtime MBean can also have public methods for shutdown, suspend, forced shutdown, and forced suspend for itself (the partition). The runtime MBean can also have similar public methods for operating on resource groups within the partition, each of which has a String resource group Name argument to select which resource group to affect.

In accordance with an embodiment, changes to a runtime MBean in a managed server do not affect the partition or resource group in other managed servers, nor are changes to a runtime MBean persisted to the runtime state of the partition or resource group.

In accordance with an embodiment, resource groups do not receive a runtime MBean at a managed server. Conceptually, a resource group by itself (apart from the resources and applications it contains) has no runtime impact on a managed server. There are no resource group-specific runtime artifacts. A partition, in contrast, does have a distinct effect on a managed server (class loaders, interceptors fired, etc.) beyond just the apps and resources within the partition.

In accordance with an embodiment, instead of resource groups getting runtime MBeans at the managed server, the PartitionRuntimeMBean and (for partition-level resource groups) the ServerRuntimeMBean can include methods which operate on resource groups, which allows the application and resource runtime MBeans within the resource group.

In accordance with an embodiment, partitions and resource groups do not have a standby state or a start operation leading to it. Instead, operations on PartitionLifeCycleRuntimeMBeans and the ResourceGroupLifeCycleRuntimeMBeans can parallel those on the ServerLifeCycleRuntimeMBean, except that there is no startInStandby method and that there is a startInAdmin method (start-in-admin for a server is governed by a Java system property setting; for partitions and resource groups we clearly need another way).

Leveraging the Deployment and Application Container Subsystem

In accordance with an embodiment, starts and graceful suspends and graceful shutdowns of the applications and resources within a partition or resource group can be performed in an order so as to prevent possible runtime problems. As an example, a JMS server might depend on a store. Because of this dependency, the store on which the JMS depends must be started before the JMS server, and the JMS server must be shut down or suspended before the store.

In accordance with an embodiment, existing deployment subsystems already implement the required ordering when it responds to server state changes. The systems and methods described herein for the partition and resource group life cycle can take advantage of what deployment already does by internally converting partition and resource group life cycle operations into corresponding calls into the deployment system.

Persisting Partition and Resource Group Runtime State

In accordance with an embodiment, the runtime state of partitions and resource groups can be persisted. When an administrator changes the state of a partition or resource group, the methods and systems can operate to record the new state of the partition or resource group in addition to performing the requested operation on the affected resources and/or partitions.

In accordance with an embodiment, during server restart the partition subsystem consults the persisted runtime state for all partitions and resource groups and brings the partitions and resource groups, and their contained applications and resources, to the correct state.

In accordance with an embodiment, the systems and methods can utilize a persistent store to manage partition and resource group states. Storing the runtime state separately from configuration allows operators who might not have authorization to change configuration to manage partition and resource group state, and it also allows customers to lock down their configuration directory, but still be able to manage the life cycle of partitions and resource groups. Note that the individual states of resources are not stored; they are implied by the state of the containing resource group and partition.

In accordance with an embodiment, each managed server can keep a local copy of the partition and resource group runtime states, both in memory and in a local persistent store.

Figure 10:
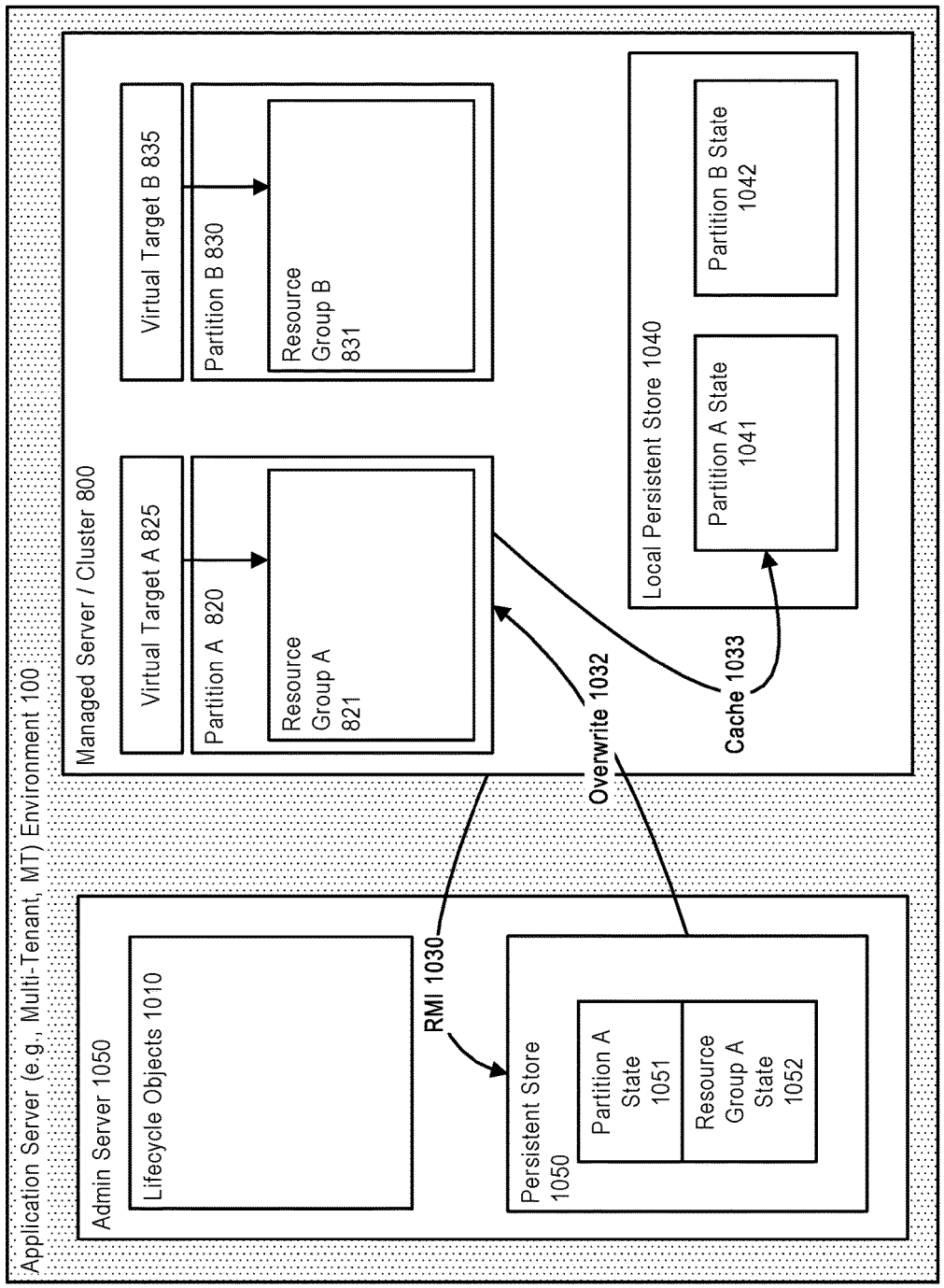
FIG. 10 illustrates supporting partition and resource group shutdown and startup within an application server environment, in accordance with an embodiment.

FIG. 10 illustrates supporting partition and resource group shutdown and startup within an application server environment, in accordance with an embodiment. More specifically, FIG. 10 illustrates persisting partition and resource group runtime state. As shown in FIG. 10, an application server environment 100 can include a managed server (or managed server cluster) 800, which can host partition A 820 and partition B 830. Partitions A and B 820 and 830, can include resource groups, such as resource group A 821 and resource group B 831, respectively, which can be associated with virtual targets 825 and 835, respectively. The managed server 800 can additionally be associated with a local persistent store 1040, which can include, for example, partition A state 1041 and partition B state 1042, among other states (not shown). The application server environment 100 can additionally include an admin server 1050, which can include lifecycle objects 1010, and a persistent store 1050, which can include, for example, partition A state 1051 and resource group A state 1052, among other states (not shown).

In accordance with an embodiment, during a restart of a managed server, such as managed server 800, the managed server can check to see if the admin server 1050 is currently up and running. Upon determining that the admin server is running, the managed server can use a RMI (Remote Method Invocation) 1030 to retrieve the admin server's copy of a partition state or resource group state, such as partition A state 1051 or resource group A state 1052, which are stored in the admin server's persistent store 1050. The managed server can then, after retrieving the admin server's copy of the requested state, overwrite 1032 an existing local copy of the state with the retrieved data from the admin server. Finally, after overwriting the local copy, the managed server can then cache 1033 the copy of the data retrieved from the admin server in the local persistent store 1040.

In accordance with an embodiment, in a situation where, upon checking, the admin server is not currently up and running, the managed server can read the locally persisted data (i.e., state) into memory.

In accordance with an embodiment, when an administrator changes a partition's or resource group's state, that change can be communicated to each affected managed server. Each managed server to which the communication is passed can then update its in-memory cache and write that out to the local persistent store. Ideally, state changes should be infrequent, and writing on each update minimizes the chance that the local persisted copy is incorrect.

Support for Resource Consumption Management

In accordance with an embodiment, resource consumption management (RCM) can require an administrator to set up a recourse in which a partition's resources in a single server can be taken down if the partition consumes too much of a system's resources (i.e., partition runs away with system resources). The systems and methods disclosed herein can provide support for this requirement by not using the partition lifecycle runtime MBean shutdown operation.

In accordance with an embodiment, life cycle runtime MBeans exist only in the admin server, which might not be running when RCM needs to take down a partition's resources in a managed server. Further, the RCM recourse should not permanently change the runtime state of the partition in that server.

In accordance with an embodiment, the systems and methods can instead utilize the PartitionRuntimeMBeans in each managed server where a partition has a footprint. RCM can then invoke a forcedShutdown method on that runtime MBean, which can cause the applications and resources for that partition in the current managed server to be shut down forcefully, thus preventing runaway resource usage by a partition.

Inceptor/Event Listener

In accordance with an embodiment, other components in the application server environment, such as various WLS (or upper stack) components, may need to intervene when partitions are started or shut down. For example, various security subsystems may need to make sure that the realm used by a starting partition is ready for use and it needs to track which partitions use each realm within a managed server so it can shut down unused realms.

In accordance with an embodiment, the methods and systems described herein can utilize interceptors to allow for such intervention. The managed servers in an application server environment, as well as the admin server, can contain a an interceptor service, for example a hk2 @Intercepted-Target service PartitionManagerService that exposes intercepted operations for operating on partitions. Interested components can, in turn, configure interceptors which can gain control as part of each of these operations. Such interceptors can perform pre-operation logic in their method invocation, then invoke proceed( ) to allow other interceptors and the base method to run, then perform post-operation logic before returning.

In accordance with an embodiment, a partition subsystem can establish correct partition identity in a current ComponentInvocationContext before interceptors are activated.

In accordance with an embodiment, an interceptor implementation can support rank among interceptors, so an interceptor can be put/put itself at the front or the back of a line using rank.

In accordance with an embodiment, interceptors can invoked synchronously. The interceptors can be, in some embodiments, inline, and not workflow, interceptors.

In accordance with an embodiment, appropriate interceptors can be invoked during server startup and shutdown, as well as when an administrator explicitly operates on a single partition.

In accordance with an embodiment, an interceptor can catch exceptions during its invocation of proceed( ) and take an appropriate recovery action.

Figure 11:
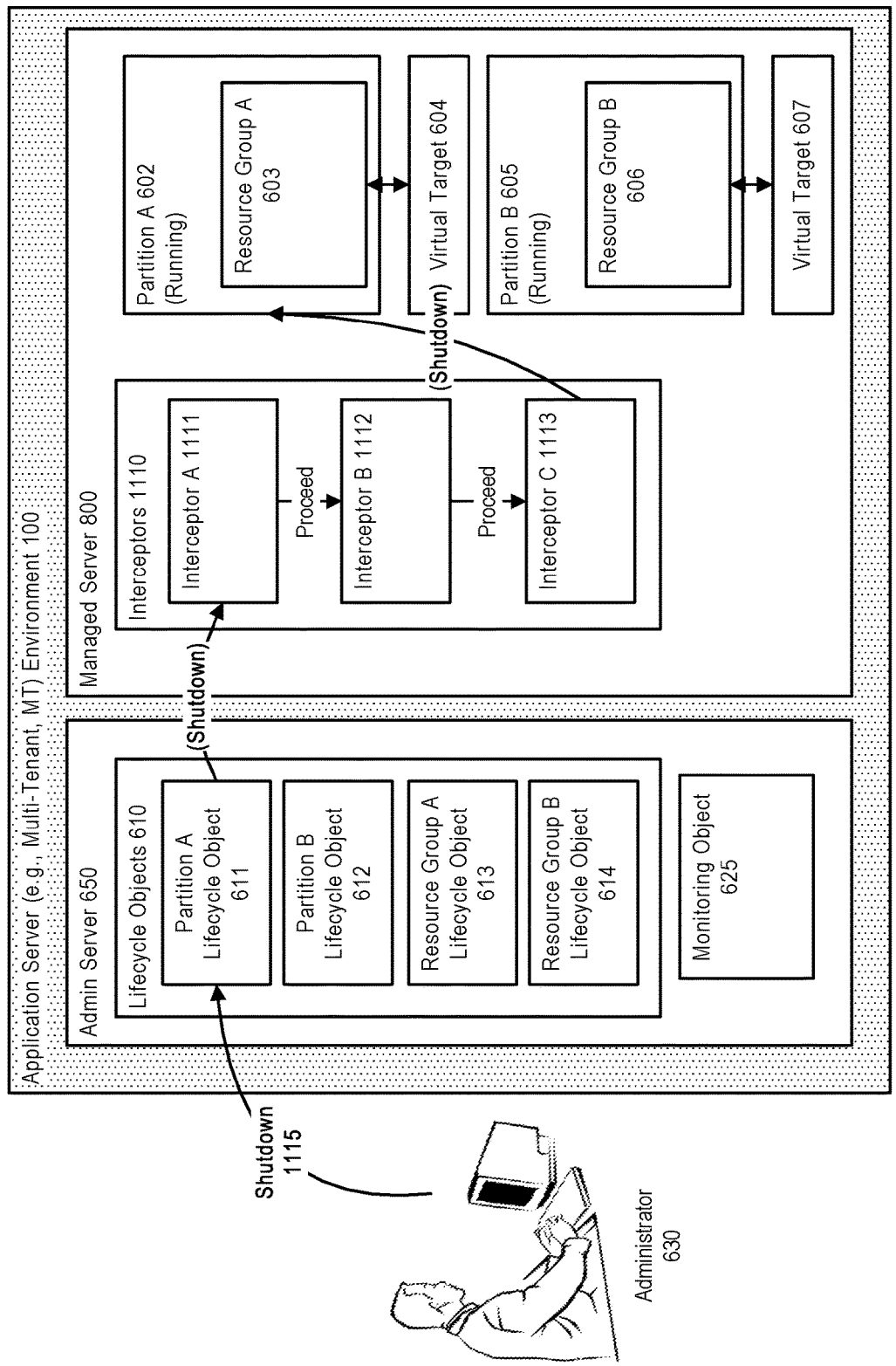
FIG. 11 illustrates supporting partition and resource group shutdown and startup within an application server environment, in accordance with an embodiment.

FIG. 11 illustrates supporting partition and resource group shutdown and startup within an application server environment, in accordance with an embodiment. More specifically, FIG. 11 illustrates the use of interceptors in conjunction with partition shutdown and startup in an application server environment, in accordance with an embodiment.

In accordance with an embodiment, as shown in FIG. 11, an application server environment 100 can include a managed server (or managed server cluster) 800, which can host partition A 602 and partition B 605. Partitions A and B 602 and 605, can include resource groups, such as resource group A 603 and resource group B 606, respectively, which can be associated with virtual targets 604 and 607, respectively. The managed server 800 can additionally include an interceptor module 1110, which can include zero or more interceptors, such as interceptor A 1111, interceptor B 1112, and interceptor C 1113.

In accordance with an embodiment, the application server environment 100 can additionally host an admin server 650, which can in turn include a number of lifecycle objects 610, such as partition A lifecycle object 611, partition B lifecycle object 612, resource group A lifecycle object 613, and resource group B lifecycle object 614. The admin server 650 can additionally include a monitoring object 625. In accordance with an embodiment, the various objects, such as the partition lifecycle objects, resource group lifecycle objects, and monitoring objects, can be various MBeans, such as lifecycleruntimeMbeans. For example, partition A lifecycle object 611 can be PartitionALifecycleRuntimeMBean, partition B lifecycle object 612 can be PartitionBLifecycleRuntimeMBmean, resource group A lifecycle object can be ResourceGroupALifecycleRuntimeMBean, and resource group B lifecycle object can be ResourceGroupBLifecycleRuntimeMBean.

In accordance with an embodiment where at least one of the partitions are currently running, an administrator 630 can perform a shutdown 1115 action in association with one or more of the running partitions. For example, as shown in FIG. 11, partition A 602 is currently running. Upon the commencement of the shutdown 1115 action performed on the partition A lifecycle object 611, the monitoring object 625 can be provided that allows for the administrator to monitor the status of the execution of the shutdown action on partition A 602.

In accordance with an embodiment, once the shutdown request is received at the managed server 800, the shutdown request can be passed through the interceptors 1110 before being allowed to operate on the running partition A. In the embodiment depicted in FIG. 11, the three interceptors A-C 1111-1113, are arranged in a hierarchal fashion whereby interceptor A 1111 can be passed before interceptor B 1112 can be activated, and interceptor B 1112 can be passed before interceptor C 1113 can be activated. In this way, if the interceptors and activated and passed (e.g., the interceptors delay the shutdown action to allow for processes running in and/or based on partition A to complete), then the shutdown action can be allowed to shutdown partition A 602.

In accordance with an embodiment, in a situation where an admin invokes an operation on a partition or resource group life cycle runtime bean, the observed behavior can follow the following route:

1. State change validation, if implemented, can be invoked.
2. The life cycle runtime method in the admin server remotely invokes the corresponding method in the affected managed servers.
3. In each affected managed server, interceptors registered on the PartitionManagerService for the operation are invoked. Each interceptor has the option of invoking proceed( ) which allows the next interceptor and, eventually, the actual method to run or throwing an exception to fail the operation. Any interceptors can catch exceptions thrown during its call to proceed( ) to detect problems in the operation itself or in other interceptors and, if appropriate, take corrective action.
4. Assuming all interceptors invoke proceed( ) the managed server activates the appropriate operation (e.g., shutdown or startup).
5. When the last interceptor leaves the call stack (either by returning or by throwing or re-throwing an exception):
    a. Event listeners in the managed server can be invoked. This can use a PropertyChangeListener objects and using an enhanced event listener.
    b. The remote invocation returns from the managed server to the admin server.

In accordance with an embodiment, the interceptors can wrap the entire synchronous operation, so proceed( ) can return normally if the operation succeeded and can throw an exception if the operation or an intervening interceptor failed. These operations are treated as short-running, not long-running workflow operations, so there can be, in some embodiments, no rollback or retry behavior.

Figure 12:
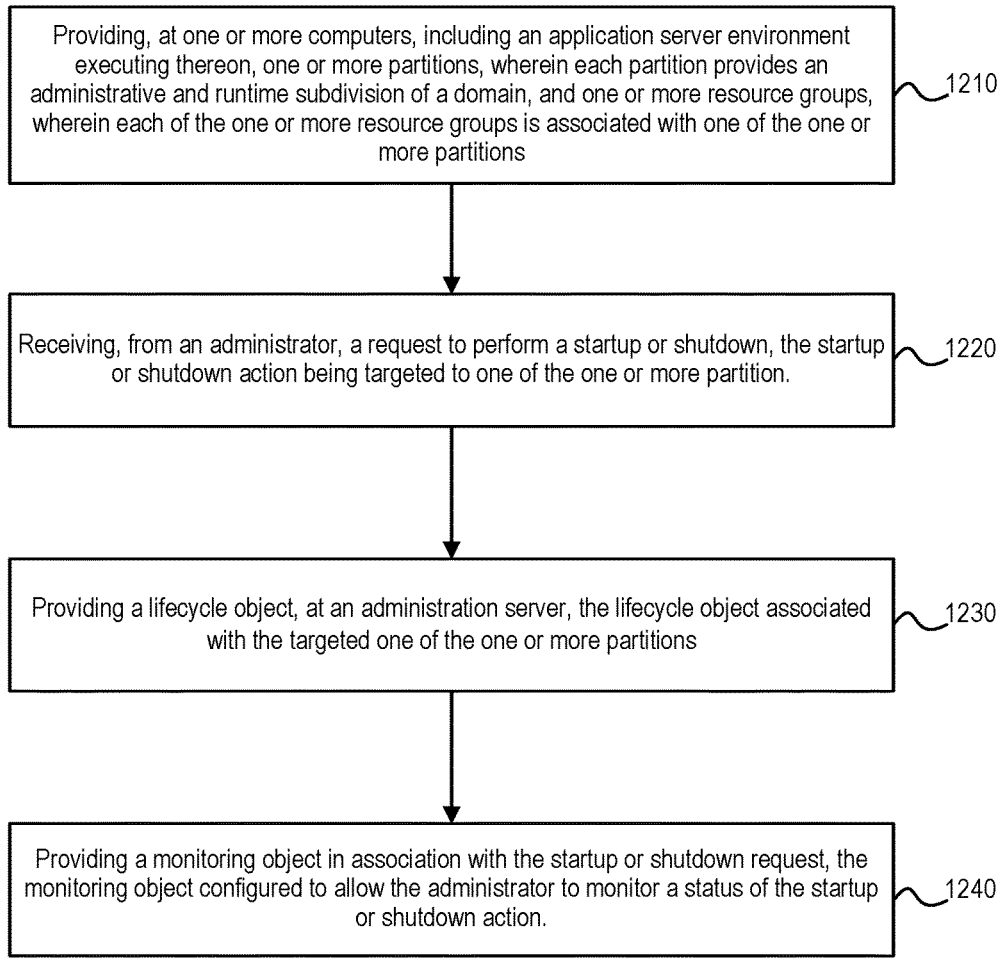
FIG. 12 illustrates a flow chart of a method for supporting partition and resource group shutdown and startup within an application server environment, in accordance with an embodiment.

FIG. 12 illustrates a flow chart of a method for supporting partition and resource group shutdown and startup within an application server environment, in accordance with an embodiment. As shown in FIG. 12, in accordance with an embodiment, at step 1210, a method can provide, at one or more computers, including an application server environment executing thereon, one or more partitions, wherein each partition provides an administrative and runtime subdivision of a domain, and one or more resource groups, wherein each of the one or more resource groups is associated with one of the one or more partitions.

At step 1220, the method can receive, from an administrator, a request to perform a startup or shutdown, the startup or shutdown action being targeted to one of the one or more partition At step 1230, the method can provide a lifecycle object, at an administration server, the lifecycle object associated with the one of the one or more partitions.

At step 1240, the method can provide a monitoring object in association with the startup or shutdown request, the monitoring object configured to allow the administrator to monitor a status of the startup or shutdown action.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting partition and resource group startup in an application server environment, comprising:
    one or more computers, including an application server environment comprising a JAVA EE application server, an administration server, and a managed server, executing thereon, together with:
        one or more partitions residing on the managed server, wherein each partition provides an administrative and runtime subdivision of a domain, and
        one or more resource groups residing on the managed server, wherein each of the one or more resource groups is associated with one of the one or more partitions, wherein each resource group references a resource group template, and wherein each resource group template includes one or more related applications together with resources upon which those applications depend;
    wherein the system provides, at the administration server, a lifecycle object, the lifecycle object associated with a targeted one of the one or more partitions and exposing a startup operation to an administration client of the administration server;
    wherein the administration server is configured to receive, from an administrator, via the administration client, a request to execute the startup operation, the startup operation being targeted to the targeted partition;
    wherein, when executed, the startup operation is communicated, via a remote method invocation, to the managed server, and wherein upon receiving the communicated startup operation, the managed server invokes a corresponding operation that initiates startup of the targeted partition including creating a runtime object associated with the targeted partition on the runtime tree of the managed server; and
    wherein the system provides a monitoring object in association with the startup operation, the monitoring object configured to allow the administrator to monitor a status of the startup operation.

2. The system of claim 1, wherein upon a shutdown operation of the managed server being requested, the managed server shuts the targeted partition down and removes the runtime object from the runtime tree of the managed.

3. The system of claim 1, wherein the system is provided within a cloud environment, to support multiple tenants operating within the cloud environment.

4. The system of claim 1, wherein the monitoring object monitors a state of the targeted partition.

5. The system of claim 1, wherein the corresponding operation that initiates startup of the targeted partition is intercepted by one or more interceptors.

6. The system of claim 5, wherein the one or more interceptors include a proceed method that allows a next interceptor to run.

7. The system of claim 6, wherein, after each interceptor has executed, the proceed method of the last interceptor to execute returns control to the corresponding operation to complete the startup operation.

8. The system of claim 1, wherein once the startup operation is completed, the remote method invocation returns from the managed server to the administration server.

9. The system of claim 1, wherein the lifecycle object and the runtime object are JAVA MBean objects.

10. A method for supporting partition and resource group shutdown and startup in an application server environment, comprising:
    providing, at one or more computers, including an application server environment comprising a JAVA EE application server, an administration server, and a managed server, executing thereon,
        one or more partitions that reside on the managed server, wherein each partition provides an administrative and runtime subdivision of a domain, and
        one or more resource groups that reside on the managed server, wherein each of the one or more resource groups is associated with one of the one or more partitions, wherein each resource group references a resource group template, and wherein each resource group template includes one or more related applications together with resources upon which those applications depend;

providing a lifecycle object, at the administration server, the lifecycle object associated with a targeted one of the one or more partitions and exposing a startup operation to an administration client of the administration server;

receiving, from an administrator via the administration client, a request to execute the startup operation, the startup operation being targeted to the targeted partition;

communicating to the managed server, via a remote method invocation, the requested startup operation;

upon receipt of the communicated startup operation by the managed server, invoking, by the managed server, a corresponding operation that initiates startup of the targeted partition including creating a runtime object associated with the targeted partition on the runtime tree of the managed server; and providing a monitoring object in association with the startup operation, the monitoring object configured to allow the administrator to monitor a status of the startup operation.

11. The method of claim 10, further comprising:
upon a shutdown operation being requested of the managed server, shutting down, by the managed server, the targeted partition and removing the runtime object from the runtime tree of the managed server.

12. The method of claim 10, wherein the method is performed within a cloud environment, to support multiple tenants operating within the cloud environment.

13. The method of claim 10, wherein the monitoring object monitors a state of the targeted partition.

14. The method of claim 10, further comprising:
intercepting, by one or more interceptors, the corresponding operation that initiates startup of the targeted partition.

15. The method of claim 14, wherein the one or more interceptors include a proceed method that allows a next interceptor to run.

16. The method of claim 15, further comprising:
after each interceptor has executed, returning control, by the proceed method of the last interceptor to execute, to the corresponding operation to complete the startup operation.

17. The method of claim 10, further comprising:
once the startup operation is completed, returning from the managed server to the administration server by the remote method invocation.

18. The method of claim 10, wherein the lifecycle object and the runtime object are JAVA MBean objects.

19. A non-transitory computer readable storage medium, including instructions stored thereon for supporting partition and resource group shutdown and startup in an application server environment which when read and executed by one or more computers cause the one or more computers to perform the steps comprising:

providing, at the one or more computers, which include an application server environment comprising a JAVA EE application server, as administration server, and a managed server, executing thereon, one or more partitions that reside on the managed server, wherein each partition provides an administrative and runtime subdivision of a domain, and one or more resource groups that reside on the managed server, wherein each of the one or more resource groups is associated with one of the one or more partitions, wherein each resource group references a resource group template, and wherein each resource group template includes one or more related applications together with resources upon which those applications depend;

providing a lifecycle object, at the administration server, the lifecycle object associated with a targeted one of the one or more partitions and exposing a startup operation to an administration client of the administration server;

receiving, from an administrator via the administration client, a request to execute the startup operation, the startup operation being targeted to the targeted partition;

communicating to the managed server, via a remote method invocation, the requested startup operation;

upon receipt of the communicated startup operation by the managed server, invoking, by the managed server, a corresponding operation that initiates startup of the targeted partition including creating a runtime object associated with the targeted partition on the runtime tree of the managed server; and providing a monitoring object in association with the startup operation, the monitoring object configured to allow the administrator to monitor a status of the startup operation.

20. The non-transitory computer readable storage medium of claim 19, the steps further comprising:
upon a shutdown operation being requested of the managed server, shutting down, by the managed server, the targeted partition the targeted partition down and removing the runtime object from the runtime tree of the managed server.

* * * * *

UNITED STATES PATENT AND TRADEMARK OFFICE
CERTIFICATE OF CORRECTION

PATENT NO. : 9,977,681 B2
APPLICATION NO. : 15/064754
DATED : May 22, 2018
INVENTOR(S) : Patel et al.

Page 1 of 1

It is certified that error appears in the above-identified patent and that said Letters Patent is hereby corrected as shown below:

In the Specification

In Column 15, Line 17, delete "a an" and insert -- an --, therefor.

In the Claims

In Column 18, Line 31, in Claim 2, delete "managed." and insert -- managed server. --, therefor.

In Column 20, Line 47, in Claim 20, after "targeted partition" delete "the targeted partition".

Signed and Sealed this
Sixth Day of November, 2018

Andrei Iancu
*Director of the United States Patent and Trademark Office*